US012138939B2

(12) United States Patent
Müller

(10) Patent No.: US 12,138,939 B2
(45) Date of Patent: Nov. 12, 2024

(54) DEVICE FOR ADJUSTING A PRINTING HEAD

(71) Applicant: Heidelberger Druckmaschinen AG, Heidelberg (DE)

(72) Inventor: Andreas Müller, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 18/610,564

(22) Filed: Mar. 20, 2024

(65) Prior Publication Data

US 2024/0316965 A1 Sep. 26, 2024

(30) Foreign Application Priority Data

Mar. 23, 2023 (DE) ..................... 10 2023 107 319.2

(51) Int. Cl.
*B41J 25/316* (2006.01)
*B41J 25/34* (2006.01)

(52) U.S. Cl.
CPC ............. *B41J 25/316* (2013.01); *B41J 25/34* (2013.01)

(58) Field of Classification Search
CPC ........ B41J 25/34; B41J 25/316; B41J 25/304; B41J 25/00; B41J 29/38; B41J 29/02; B41J 25/3086; B41J 25/001; B41J 2202/21; B41J 2/145
See application file for complete search history.

(56) References Cited

U.S. PATENT DOCUMENTS

| | | | | |
|---|---|---|---|---|
| 3,211,269 | A | 10/1965 | Emig | |
| 3,435,167 | A | 3/1969 | Pfleger | |
| 9,358,818 | B2 | 6/2016 | Von Essen et al. | |
| 9,802,409 | B2 * | 10/2017 | Yamabe | B41J 2/145 |
| 9,878,564 | B2 * | 1/2018 | Mueller | B41J 2/155 |
| 10,457,047 | B2 | 10/2019 | Brandenberger et al. | |
| 10,737,516 | B2 | 8/2020 | Mueller | |

FOREIGN PATENT DOCUMENTS

| | | | |
|---|---|---|---|
| DE | 1252497 | B | 4/1968 |
| DE | 102016209945 | A1 | 1/2017 |
| DE | 102017215314 | A1 | 4/2018 |
| EP | 3530473 | A1 | 8/2019 |
| EP | 3527390 | B1 | 2/2020 |
| WO | 2014160219 | A1 | 10/2014 |
| WO | 2017011924 | A1 | 1/2017 |

* cited by examiner

*Primary Examiner* — Jannelle M Lebron
(74) *Attorney, Agent, or Firm* — Laurence A. Greenberg; Werner H. Stemer; Ralph E. Locher

(57) ABSTRACT

A device for adjusting a printing head includes a step-by-step switching mechanism, an actuator for shifting the step-by-step switching mechanism, and a locking disk supported for rotation. A first shifting tongue is provided for incrementally rotating the locking disk in a first direction of rotation. The first shifting tongue has two elongated holes for guidance purposes, one of which has a lateral recess. It is thus possible to adjust printing heads with a high degree of accuracy while saving time and costs. The device is preferably implemented in industrial inkjet printing.

10 Claims, 7 Drawing Sheets

DEVICE FOR ADJUSTING A PRINTING HEAD

CROSS-REFERENCE TO RELATED APPLICATION

This application claims the priority, under 35 U.S.C. § 119, of German Patent Application DE 10 2023 107 319.2, filed Mar. 23, 2023; the prior application is herewith incorporated by reference in its entirety.

FIELD AND BACKGROUND OF THE INVENTION

The invention relates to a device for adjusting a printing head, including a step-by-step switching mechanism, an actuator for shifting the step-by-step switching mechanism, and a rotatably supported locking disk.

The technical field of the invention is the field of the graphic industry and in particular the field of industrial, i.e. high-performance inkjet printing on flat substrates, i.e. the application of tiny drops of liquid ink in accordance with an image onto sheet-shaped, foil-shaped, label-shaped, or web-shaped printing substrates, preferably made of paper, paperboard, cardboard, plastic, metal, or composite materials. The application of the ink is achieved by using inkjet printing heads, which need to be accurately adjusted relative to one another in terms of their positions and alignment for high quality printing.

DESCRIPTION OF THE RELATED ART

German Patent Application DE 10 2016 209 945 A1 discloses a device for adjusting printing heads. For every printing head, the device includes a step-by-step switching mechanism and a movable slide to actuate the step-by-step switching mechanism. The slide can be positioned in positions opposite every printing head to be adjusted.

German Patent Application DE 10 2017 215 314 A1 discloses a similar device for adjusting printing heads and a printing unit of that general type, i.e. a printing unit that has the features listed above. For every printing head, the device includes a step-by-step switching mechanism and an actuator disposed on a movable slide to actuate the step-by-step switching mechanism. Through the use of the slide, the actuator can be positioned in positions opposite every printing head to be adjusted, where the actuator may be operated pneumatically, for example. The respective step-by-step switching mechanism includes a threaded spindle with a cone. The spindle is incrementally rotated by an entrainment lever via gearwheels in a switching operation.

European Patent Application EP 3530473 A1, corresponding to U.S. Pat. No. 10,737,516, discloses a further device for adjusting printing heads. The device includes two step-by-step switching mechanisms for every printing head to be adjusted, i.e. one for every degree of freedom (rotation, translation).

International Publication WO2017/011924A1, corresponding to U.S. Pat. No. 10,457,047, likewise discloses a further device for adjusting printing heads.

In comparison, European Patent Application EP 3527390 B1 discloses a device for adjusting printing heads. The device is operated without tools and includes a cone and a head with a ratchet.

International Publication WO2014/160219A1, corresponding to U.S. Pat. No. 9,358,818, discloses an adjustable mount for a printing head. The mount may be clamped by two clamping jaws via a lever and a thrusting wedge.

The accurate adjustment of a high number of printing heads by using a correspondingly high number of adjustment components and drives may be time-consuming and costly corresponding to the number of components and drives to be provided for that purpose.

SUMMARY OF THE INVENTION

It is accordingly an object of the invention to provide a device for adjusting a printing head, which overcomes the hereinafore-mentioned disadvantages of the heretofore-known devices of this general type, which provides an improvement over the prior art and which, in particular, provides a way of accurately adjusting printing heads while keeping the required time short and costs low.

With the foregoing and other objects in view there is provided, in accordance with the invention, a device for adjusting a printing head, comprising a step-by-step switching mechanism, an actuator for shifting the step-by-step switching mechanism, a locking disk supported for rotation, and a first shifting tongue for incrementally rotating the locking disk in a first direction of rotation, the first shifting tongue having two elongated holes for guidance purposes, one of which has a lateral recess.

Advantageous and thus preferred further developments of the invention will become apparent from the dependent claims as well as from the description and drawings.

The invention provides an advantageous way of accurately adjusting printing heads while at the same time keeping the required time short and costs low.

The provision of the elongated holes, one of which has a lateral recess, as envisaged by the invention, creates a simple technical solution for a step-by-step switch mechanism for adjusting a printing head with a shifting tongue that is movable and operable by an actuator.

The following paragraphs describe preferred further developments of the invention (in short: further developments).

A further development may be that a second shifting tongue is provided to incrementally rotate the locking disk in a second direction of rotation opposite the first direction of rotation, the second shifting tongue including two elongated holes for the guidance thereof, one of which has a lateral recess.

A further development may be that the two elongated holes with a lateral recess are used for a lateral compensatory movement of the respective shifting tongue.

A further development may be that the two elongated holes with a lateral recess are configured to be mirror-symmetrical to one another.

A further development may be that the first shifting tongue or the second shifting tongue carries out a respective forward movement as a shifting movement and an opposite return movement.

A further development may be that in the shifting movement, the first shifting tongue or the second shifting tongue shifts the locking disk in a form-locking way. A further development may be that in the return movement, the first shifting tongue or the second shifting tongue grazes the locking disk in a frictionally engaging way.

A further development may be that the locking disk is assigned a block or a brake which prevents any uncontrolled shifts of the locking disk and/or prevents shifts caused by the return movement of the shifting tongues. The brake may be configured as a disk spring provided underneath the locking disk.

A further development may be that every shifting tongue is assigned a spring element which disengages the unactuated shifting tongue from the locking disk.

A further development may be that a transmission is provided which translates the adjustment movement of the locking disk into a correction movement of the printing head.

Any desired combination of the features and combinations of features disclosed in the above sections on the technical field, invention, and further developments as well as in the section below on exemplary embodiments likewise represents advantageous further developments of the invention.

Other features which are considered as characteristic for the invention are set forth in the appended claims.

Although the invention is illustrated and described herein as embodied in a device for adjusting a printing head, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
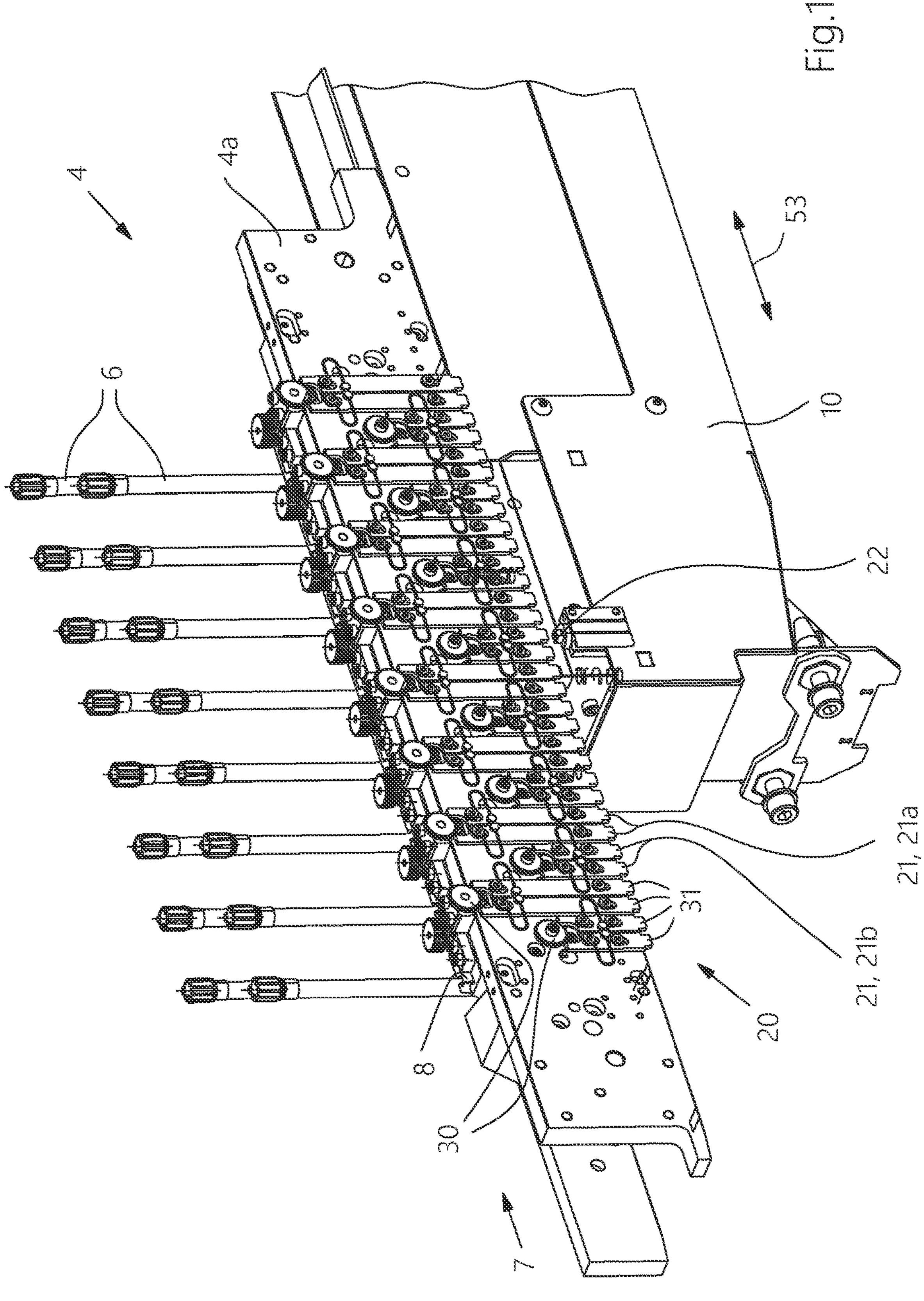
FIG. 1 is a fragmentary, diagrammatic, perspective view of a preferred exemplary embodiment of a print bar of a printing unit according to the invention.
Figure 7:
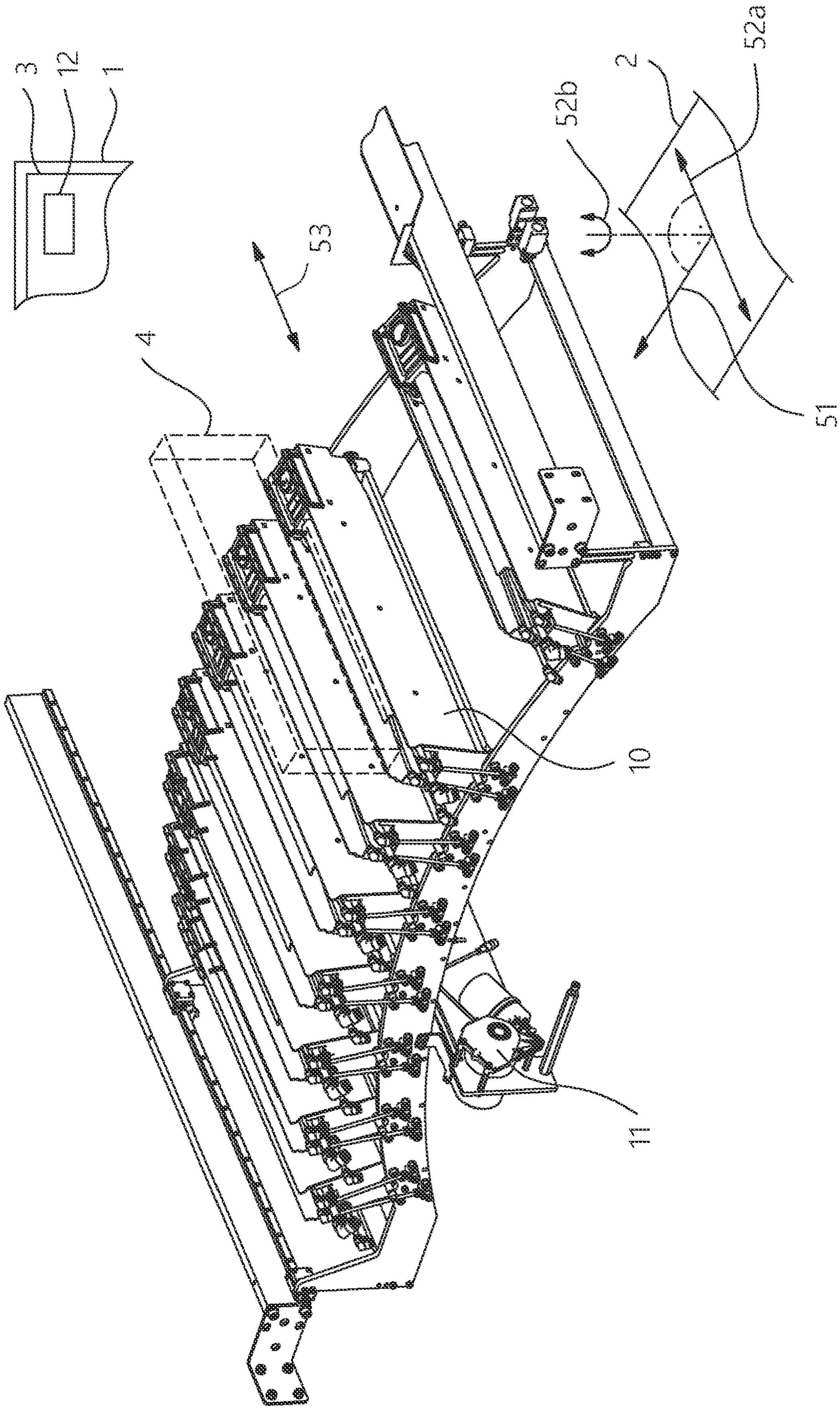
FIG. 7 is a perspective view showing details of a preferred exemplary embodiment of an inkjet printing machine for printing on a printing substrate such as a web of paper.

Referring now in detail to the figures of the drawings, in which corresponding features have the same reference symbols and repetitive reference symbols have sometimes been left out for reasons of visibility, and first, particularly, to FIG. 1 thereof, there is seen a perspective view of a preferred exemplary embodiment of a print bar of a printing unit of the invention (for instance a printing unit 3 of an inkjet printing machine 1, as seen in FIG. 7). A print bar 4, which is preferably disposed to be stationary, includes a crossbar 4*a*. A plurality of neighboring printing heads 5 is disposed in a row 7 on the crossbar. Every printing head is disposed in a respective printing head mount 8 in a guide 9 and includes a nozzle surface 5*a* (see also FIG. 2, for example). Ink is supplied to the printing heads 5, preferably in a circulatory manner, for instance by using illustrated lines 6. The inkjet printing machine 1 further includes a computer 12, preferably a digital computer for controlling the adjustment process.

FIG. 1 further illustrates an adjustment device 20 for adjusting/orienting the individual printing heads 5. The adjustment device 20 includes a plurality of step-by-step switches 21 disposed adjacent to one another/in a row, each including a first step-by-step switching mechanism 21*a* and a second step-by-step switching mechanism 21*b*. FIGS. 2 to 6 illustrate details of the step switching units, which will be explained in more detail in the context of these figures.

Like every printing bar, the printing bar 4 shown in FIG. 1 is assigned a cleaning device 10 movable back and forth in a direction 53 to clean the printing heads on printing bar 4, which is preferably disposed to be stationary. During a printing operation, the cleaning device 10 is in a stand-by position (illustrated on the right-hand side of FIG. 1). In the cleaning mode, the cleaning device 10 is in a cleaning position (illustrated on the left-hand side in FIG. 1). In the representation of FIG. 1, the cleaning device 10 is in an intermediate position. The cleaning itself is not part of the invention. At least one jointly movable actuator 22, preferably a pneumatically operated actuator, is disposed on the movable cleaning device 10. A drive motor 11 is provided to move the cleaning device(s) 10, as seen in FIG. 7.

Figure 2:
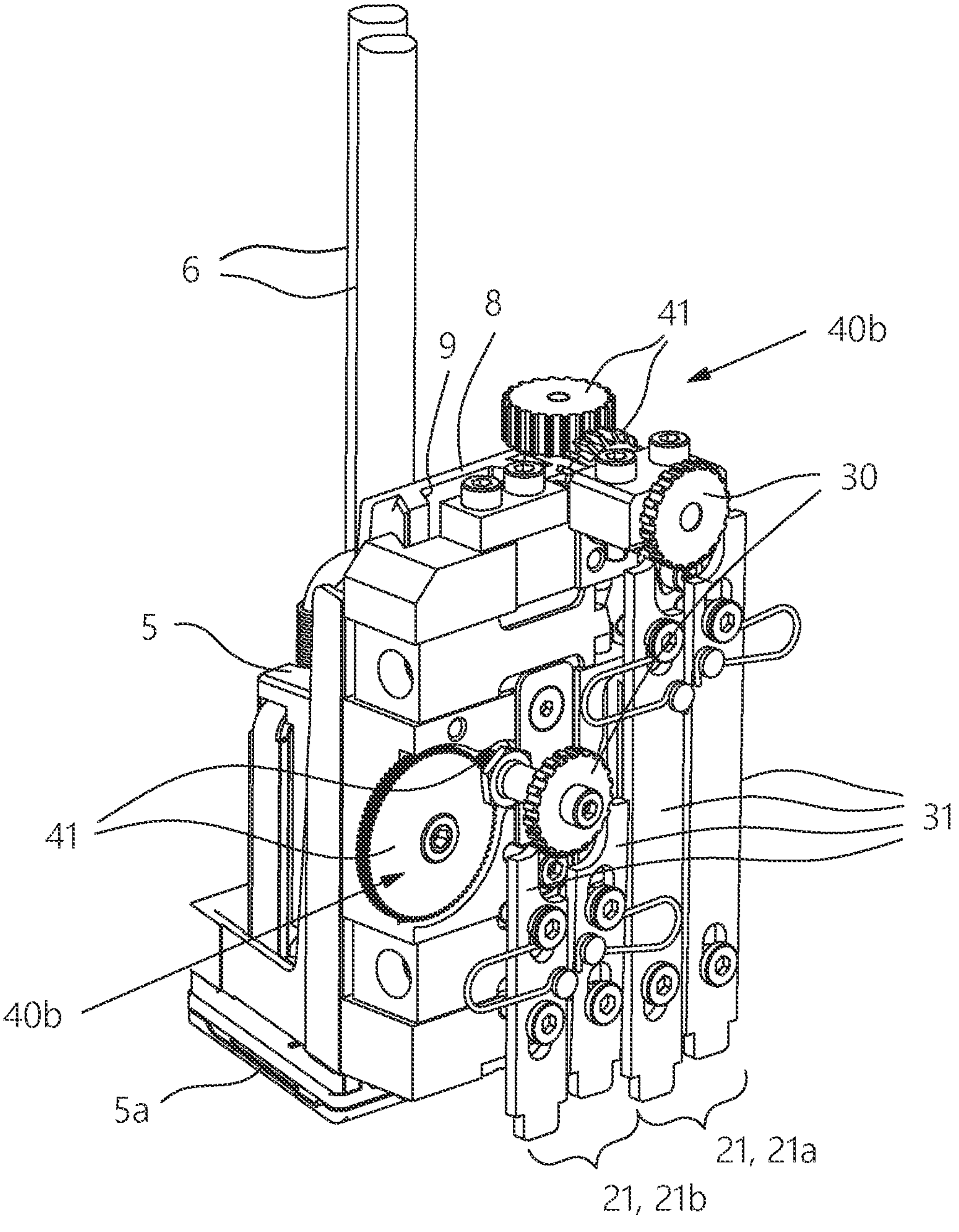
FIG. 2 is a perspective view of a preferred exemplary embodiment of two step-by-step switches.

FIG. 2 is a perspective view of a preferred exemplary embodiment of two step-by-step switches: namely of a first step-by-step switching mechanism 21*a* and a second step-by-step switching mechanism 21*b*. Every one of the two step-by-step switches includes an incrementally rotatable locking disk 30. Every one of the two step-by-step switches further includes two shifting tongues 31, which are preferably movable in a vertical direction and individually actuatable: a first shifting tongue 31*a*, a second shifting tongue 31*b*, a third shifting tongue 31*c*, and a fourth shifting tongue 31*d*. Transmissions 40*a* and 40*b* with gearwheels 41 and/or tapered spindles 42, for example, are assigned to the step-by-step switches 31 to translate the respective shifting movement into a corrective movement of the printing heads.

Every shifting tongue 31 preferably includes a protrusion 32 (see FIG. 5), which interacts with the locking disk 30 or rather the locking elements thereof in the shifting operation. Every shifting tongue 31 further includes a first elongated hole 33 and a second elongated hole 34. The first elongated hole 33 (e.g. the upper one) has a lateral recess 35. In cooperation with pins 36, the two elongated holes make the movement possible and limit it at the same time. In an unactuated state, the respective shifting tongues 31 are preferably located in a lower position into which they are pressed by a respective spring element 37. In an actuated state, the respective shifting tongues 31 are preferably in an upper position wherein the locking disk 30 is rotated one locking element further. A pressure element 38 prevents the locking disk 30 from rotating in an undesired way; alternatively, a spring plate may be provided, for instance.

Figure 3:
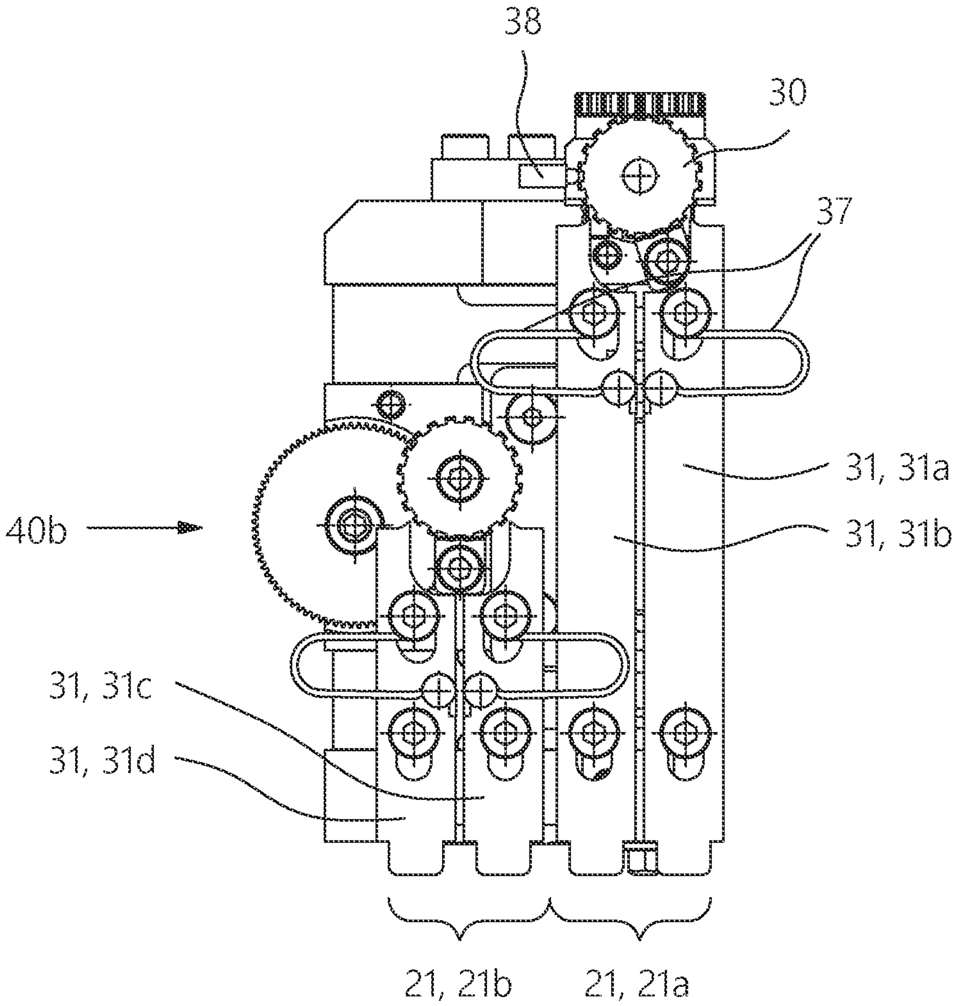
FIG. 3 is a side-elevational view of the same preferred exemplary embodiment of two step-by-step switching mechanisms shown in FIG. 2 in an unactuated state.
Figure 4:
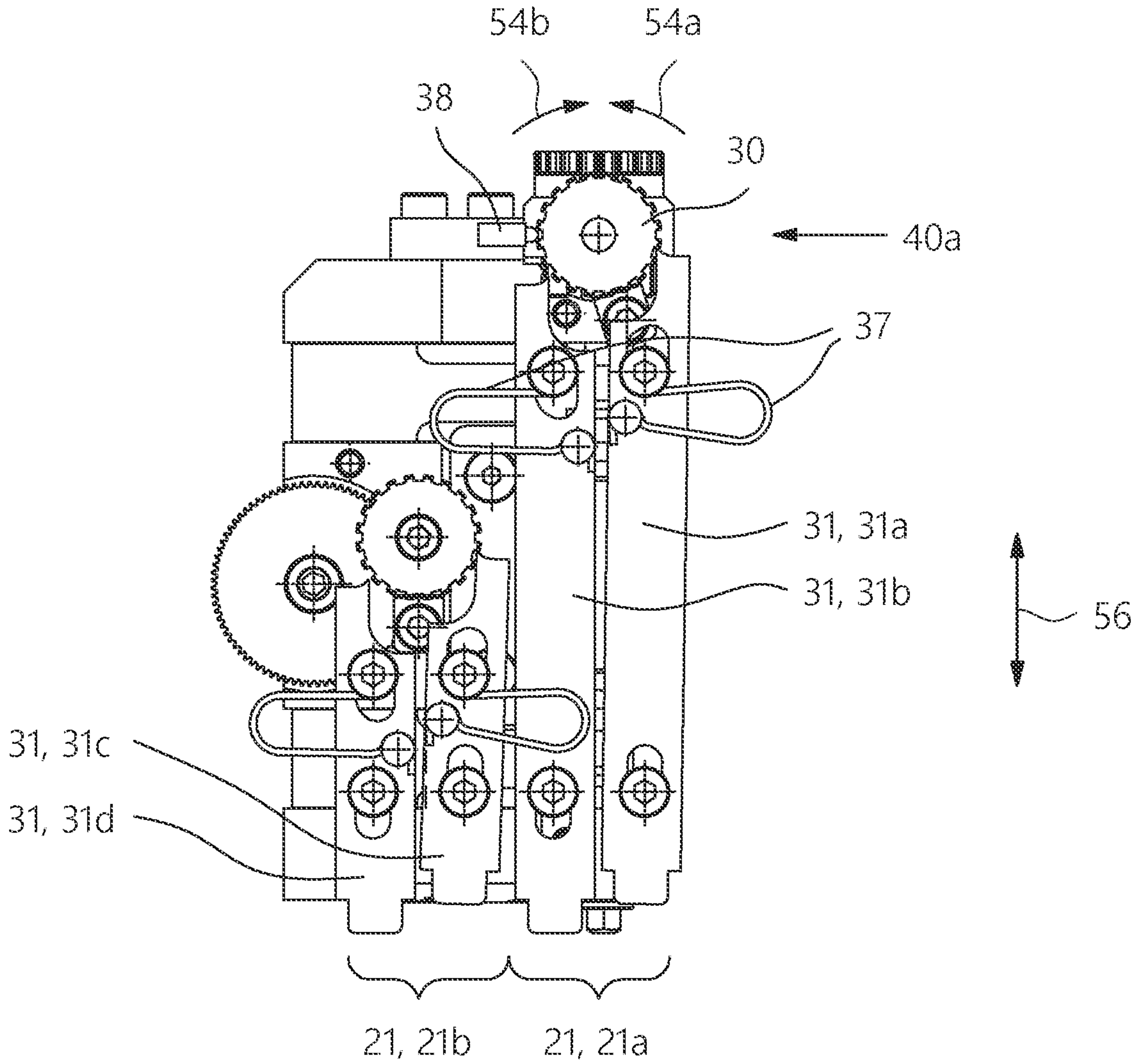
FIG. 4 is a view similar to FIG. 3 of the two step-by-step switch mechanisms in an actuated state.

FIG. 3 is a side view of the same preferred exemplary embodiment of two step-by-step switching mechanisms in an unactuated state, while FIG. 4 is a side view of the same preferred exemplary embodiment of two step-by-step switching mechanisms in an actuated state. A comparison of FIGS. 3 and 4 reveals that the two actuated shifting tongues 31*a* and 31*c* have moved upward/are located in an upper position whereas the two unactuated shifting tongues 31*b* and 31*d* are located in a lower position.

Figure 5:
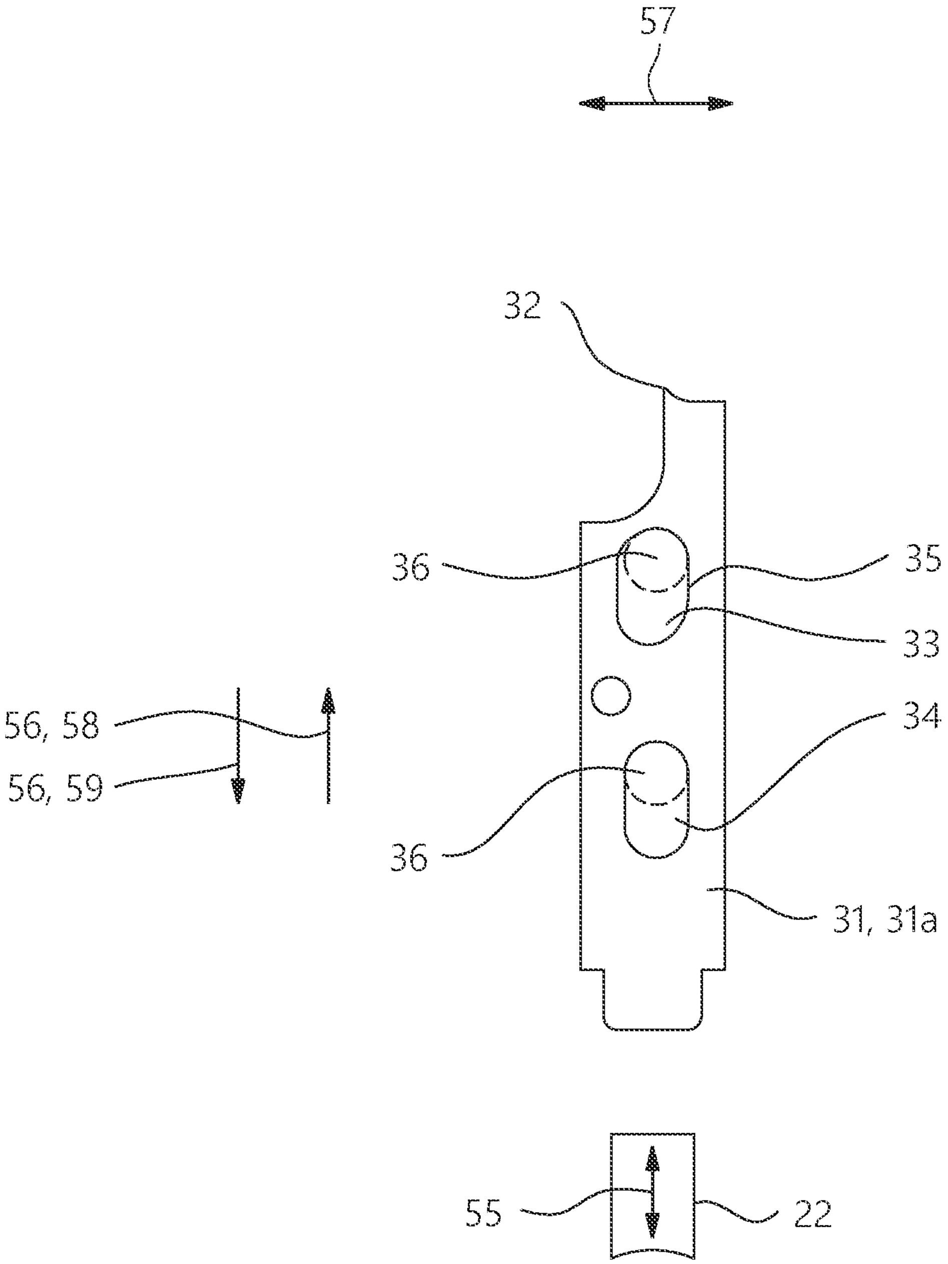
FIG. 5 is a fragmentary, side-elevational view of a preferred exemplary embodiment of a shifting tongue.

FIG. 5 is a side view of a preferred exemplary embodiment of a shifting tongue. For actuation purposes, a change in the position of the cleaning device 10 causes the actuator 22 to move into position, i.e. into a position opposite one of the shifting tongues 31, where it is then preferably actuated by the computer 12 to carry out a movement in a direction 55. In this process, the actuator contacts the respective shifting tongue 31, for example tongue 31*a*, and moves the latter in accordance with the configuration of the first elongated hole 33 and of the second elongated hole 34. Accordingly, the shifting tongue 31 carries out a movement in a direction 56: either a forward movement 58 (as the shifting movement; in the illustrated example, this is an upward movement) or a return movement 59 (in the illustrated example, this is a downward movement). In the shifting movement, a lateral compensation movement of the shifting tongue is made possible by the lateral recess 35. When a shifting operation is carried out with the shifting tongue 31*a*, the protrusion 32 preferably rotates the locking disk 30 in a first direction of rotation 54*a*; in contrast, when a shifting operation is carried out with shifting tongue 31*b*, the protrusion 32 preferably rotates the locking disk 30 in an opposite, second direction of rotation 54*b*.

Figure 6:
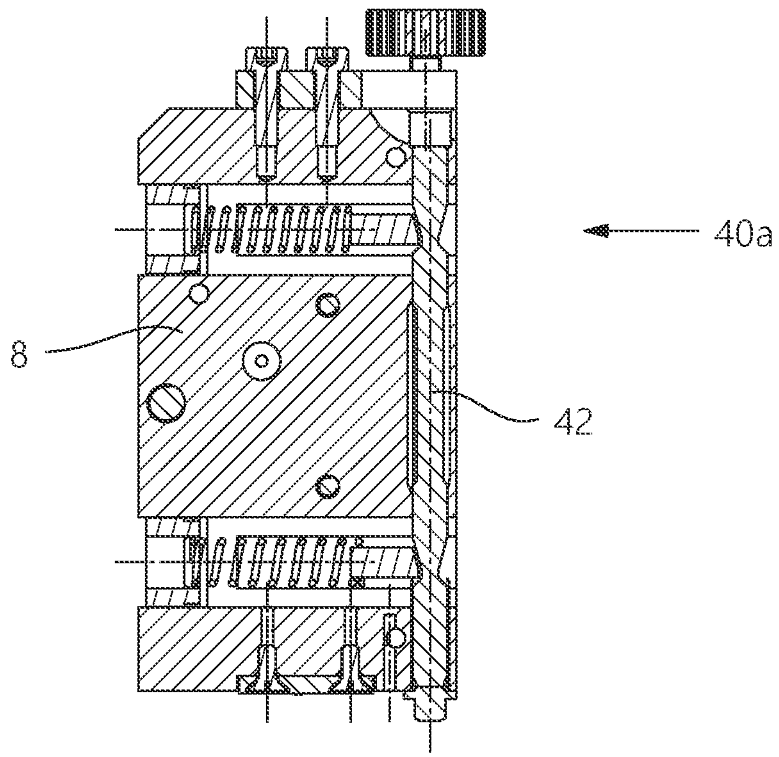
FIG. 6 is a vertical-sectional view of a preferred exemplary embodiment of a transmission.

FIG. 6 is a sectional view of a preferred exemplary embodiment of a transmission. The figure shows a tapered spindle 42, which translates the rotary movement provided by the locking disk 30 (and potentially gearwheels connected in between) into a corrective movement of the respective printing head 5/the printing head mount 8 thereof. For this purpose, as shown in FIG. 6, the tapered spindle is moved in a vertical direction due to a rotation thereof. This vertical movement is translated into a horizontal movement of the printing head/printing head mount via a respective cone.

FIG. 7 illustrates details of a preferred exemplary embodiment of an inkjet printing machine 1 for printing on a printing substrate 2 such as a web of paper. The inkjet printing machine 1 preferably includes multiple printing units 3 for printing operations involving multiple colors. Every one of the printing units 3 includes a printing bar 4 (only one of which is shown by way of example) oriented in a transverse direction 52*a* relative to the direction of transport 51 of the printing substrate and including printing heads 5. The drive motor 11 causes a horizontal displacement of at least one of the cleaning devices 10 (preferably a joint displacement of all cleaning devices; e.g. by using a common frame) in a direction of movement 53 along the printing bars 4. In this process, the actuator 22 successively reaches positions opposite every step-by-step switching mechanism 21 and may actuate each one as needed, i.e. shift it once or multiple times as a function of the correction requirements. The corrective movement of the respective printing head 5, the position and/or orientation of which requires correction, is achieved incrementally/in a step-by-step way (and preferably in micrometer steps) in the transverse direction 52*a* and/or in terms of its angle 52*b* relative to the direction of transport 51.

The following is a summary list of reference numerals and the corresponding structure used in the above description of the invention.

LIST OF REFERENCE SYMBOLS

1 inkjet printing machine
2 printing substrate
3 printing unit
4 printing bar
4*a* crossbar
5 printing head/printing heads
5*a* nozzle surface
6 line(s)
7 row
8 printing head mount
9 guide
10 cleaning device
11 drive motor
12 computer
20 adjustment device
21 step-by-step switching mechanism(s)
21*a* first step-by-step switching mechanism
21*b* second step-by-step switching mechanism
22 actuator(s)
30 locking disk
31 shifting tongue(s)
31*a* first shifting tongue
31*b* second shifting tongue
31*c* third shifting tongue
31*d* fourth shifting tongue
32 protrusion
33 first elongated hole
34 second elongated hole
35 lateral recess
36 pin(s)
37 spring element
38 block or brake, in particular pressure element
40*a* transmission
40*b* transmission
41 gearwheel(s)
42 tapered spindle(s)
51 direction of transport of the printing substrate
52*a* transverse direction
52*b* angle
53 direction of movement of the cleaning device
54*a* first direction of rotation of the locking disk
54*b* second direction of rotation of the locking disk
55 direction of movement of the actuator
56 direction of movement of the shifting tongue
57 lateral compensation movement
58 forward movement/shifting movement
59 return movement

The invention claimed is:

1. A device for adjusting a printing head, the device comprising:
- a step-by-step switching mechanism;
- an actuator for shifting said step-by-step switching mechanism;
- a rotatably supported locking disk; and
- a first shifting tongue for incrementally rotating said locking disk in a first direction of rotation, said first shifting tongue having two elongated holes for guidance, one of said elongated holes having a lateral recess.

2. The device according to claim 1, which further comprises a second shifting tongue for incrementally rotating said locking disk in a second direction of rotation opposite the first direction of rotation, said second shifting tongue having two elongated holes for guidance, one of said elongated holes having a lateral recess.

3. The device according to claim 2, wherein said two elongated holes having said lateral recess acting to allow a lateral compensation movement of a respective shifting tongue.

4. The device according to claim 2, wherein said two elongated holes having said lateral recess are mirror-symmetrical to one another.

5. The device according to claim 2, wherein said first shifting tongue or said second shifting tongue carries out a forward movement as a shifting movement and a return movement in an opposite direction.

6. The device according to claim 5, wherein said first shifting tongue or said second shifting tongue shifts said locking disk in a form-locking way in said shifting movement.

7. The device according to claim 6, wherein said first shifting tongue or said second shifting tongue grazes said locking disk in a frictionally engaging way in said return movement.

8. The device according to claim 5, which further comprises a block or a brake associated with said locking disk for preventing at least one of any uncontrolled shifts of said locking disk or any shifts caused by said return movement of said shifting tongues.

9. The device according to claim 1, which further comprises spring elements each associated with a respective one of every shifting tongue for disengaging said respective shifting tongue, in an unactuated state, from a respective locking disk.

10. The device according to claim 1, which further comprises a transmission translating an actuating movement of said locking disk into a corrective movement of the printing head.

* * * * *